(12) United States Patent
Hall

(10) Patent No.: US 8,084,715 B2
(45) Date of Patent: Dec. 27, 2011

(54) METHOD AND MEANS FOR HEATING AND CONTROLLING THE TEMPERATURES IN A SAUNA

(75) Inventor: Keith A. Hall, Bettendorf, IA (US)

(73) Assignee: Quad Cities Automatic Pools, Inc., Bettendorf, IA (US)

( * ) Notice: Subject to any disclaimer, the term of this patent is extended or adjusted under 35 U.S.C. 154(b) by 366 days.

(21) Appl. No.: 12/296,502

(22) PCT Filed: Apr. 10, 2006

(86) PCT No.: PCT/US2006/013050
§ 371 (c)(1),
(2), (4) Date: Oct. 8, 2008

(87) PCT Pub. No.: WO2007/117234
PCT Pub. Date: Oct. 18, 2007

(65) Prior Publication Data
US 2009/0276950 A1    Nov. 12, 2009

(51) Int. Cl.
*H05B 3/00* (2006.01)
*H02J 3/14* (2006.01)

(52) U.S. Cl. ........ 219/200; 219/494; 219/483; 219/486; 219/508; 219/509; 307/38; 307/39

(58) Field of Classification Search .................. 219/200, 219/494, 483, 486, 508, 509; 307/38, 39
See application file for complete search history.

(56) References Cited

U.S. PATENT DOCUMENTS

| | | | |
|---|---|---|---|
| 4,908,498 A * | 3/1990 | Kivela | 219/494 |
| 5,504,306 A * | 4/1996 | Russell et al. | 219/497 |
| 6,965,097 B2 | 11/2005 | Lee | |
| 2004/0129693 A1* | 7/2004 | Hook | 219/483 |

\* cited by examiner

Primary Examiner — Shawntina Fuqua

(57) ABSTRACT

A control panel used in combination with a power unit to control the operation of a sauna. The control panel is equipped with a microprocessor that has software and proper circuitry to allow a user to use buttons to input information into the control panel regarding the time, temperature, and day on which heating within the sauna is to occur. Additionally, the power unit has a microprocessor with a pulse width modulation output that causes individual heating elements to continuously produce varying intensities of heat in order to maintain a consistent desired temperature, and/or intermittently radiate heat creating a wave of heat to be emitted by each individual heating element.

14 Claims, 8 Drawing Sheets

METHOD AND MEANS FOR HEATING AND CONTROLLING THE TEMPERATURES IN A SAUNA

BACKGROUND OF THE INVENTION

Modern sauna compartments are often heated by an infrared heater which is controlled by a thermostat. The thermostat will be set at a maximum temperature such as 120° Fahrenheit. When that temperature is reached, the thermostat interrupts the flow of energy to the heater which is then energized. A person in the sauna immediately feels chilled when the infrared is completely turned off at the 120° Fahrenheit maximum temperature level.

Therefore, a principal object of the present invention is to provide a method and means of heating a sauna compartment and controlling the heat so that the heat is more evenly supplied.

A further object of the invention is to provide a programmable sauna control for setting the temperature of a sauna.

These and other objects will be apparent to those skilled in the art.

BRIEF SUMMARY OF THE INVENTION

A control panel for a sauna compartment and a power unit associated with the control panel that allows high voltage to flow through multiple heating elements. The control panel contains a plurality of buttons that are electrically connected to a computer chip that contains software for signaling the power unit that controls the heating of the sauna. The control software includes a pulse width modulator output for causing the heating elements to emit variable power settings of heat to provide a constant and continuous heating experience. The control panel contains lighting and a plurality of displays that provide information such as a real time clock temperature and a timer. Additionally, the software is programmed to store information regarding the operation of the sauna. The power unit also contains a chip having software that is in communication with the chip in the control panel and controls the operation of the heating elements on the power unit. The heating elements are controlled by the pulse width modulations scheme operated by the power unit processor.

DETAILED DESCRIPTION OF THE PREFERRED EMBODIMENT

Figure 1:
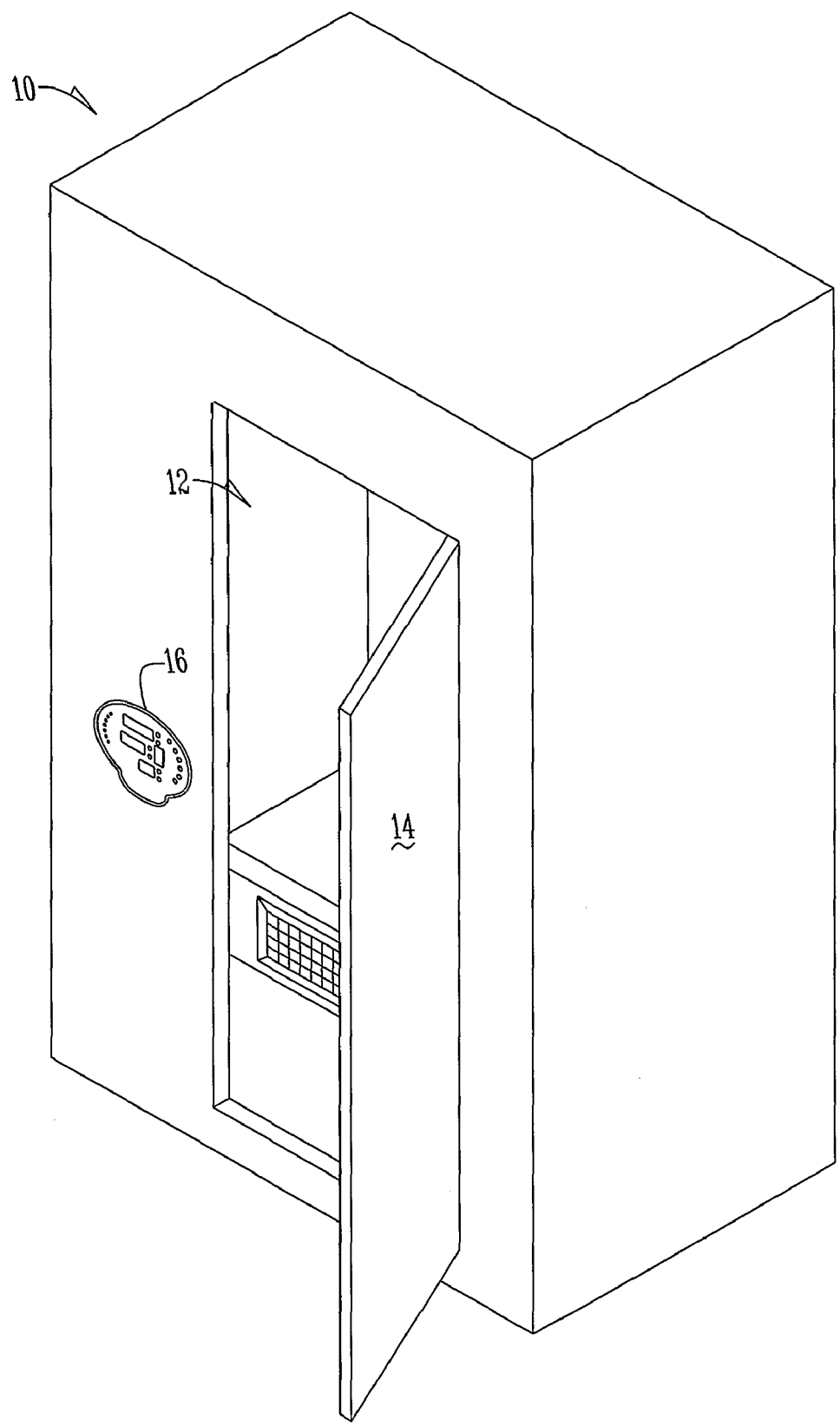
FIG. 1 is a perspective view of a sauna compartment having a control panel.

A sauna compartment 10 has door opening 12 and door 14 adapted to close the opening 12. A control panel 16 is mounted in the wall of compartment 10 adjacent the door as shown in FIG. 1. The control panel 16 has a plurality of openings 18 thereon with days of the week adjacent each opening and additionally has a plurality of windows or displays 20 for displaying digital images such as real time clock, temperature, and timer. The control panel or interface 16 additionally has a plurality of buttons 22 that control the functioning of the control panel 16 and sauna compartment 10.

Figure 2:
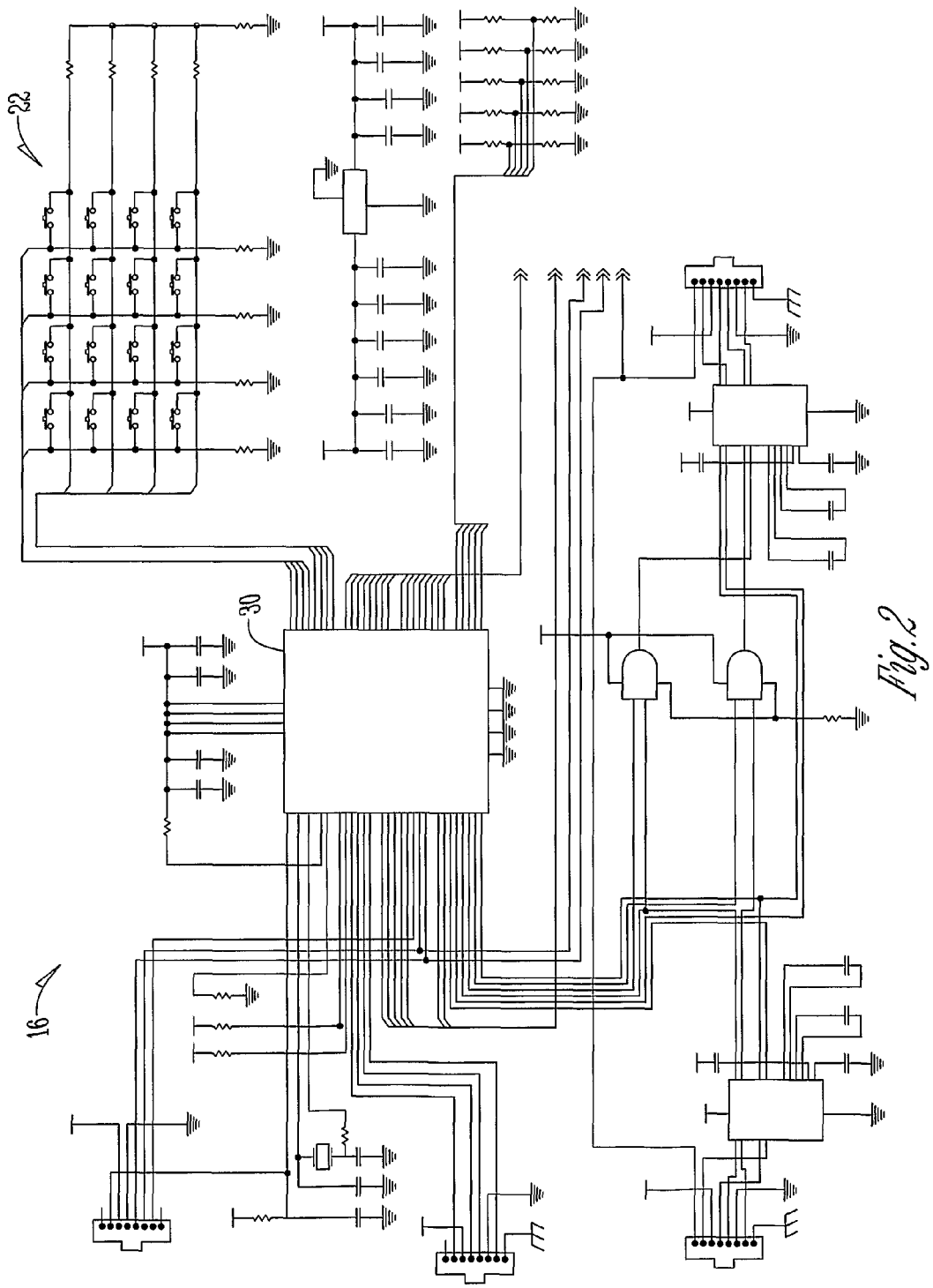
FIG. 2 is a schematic diagram of a control panel including a microprocessor.
Figure 3:
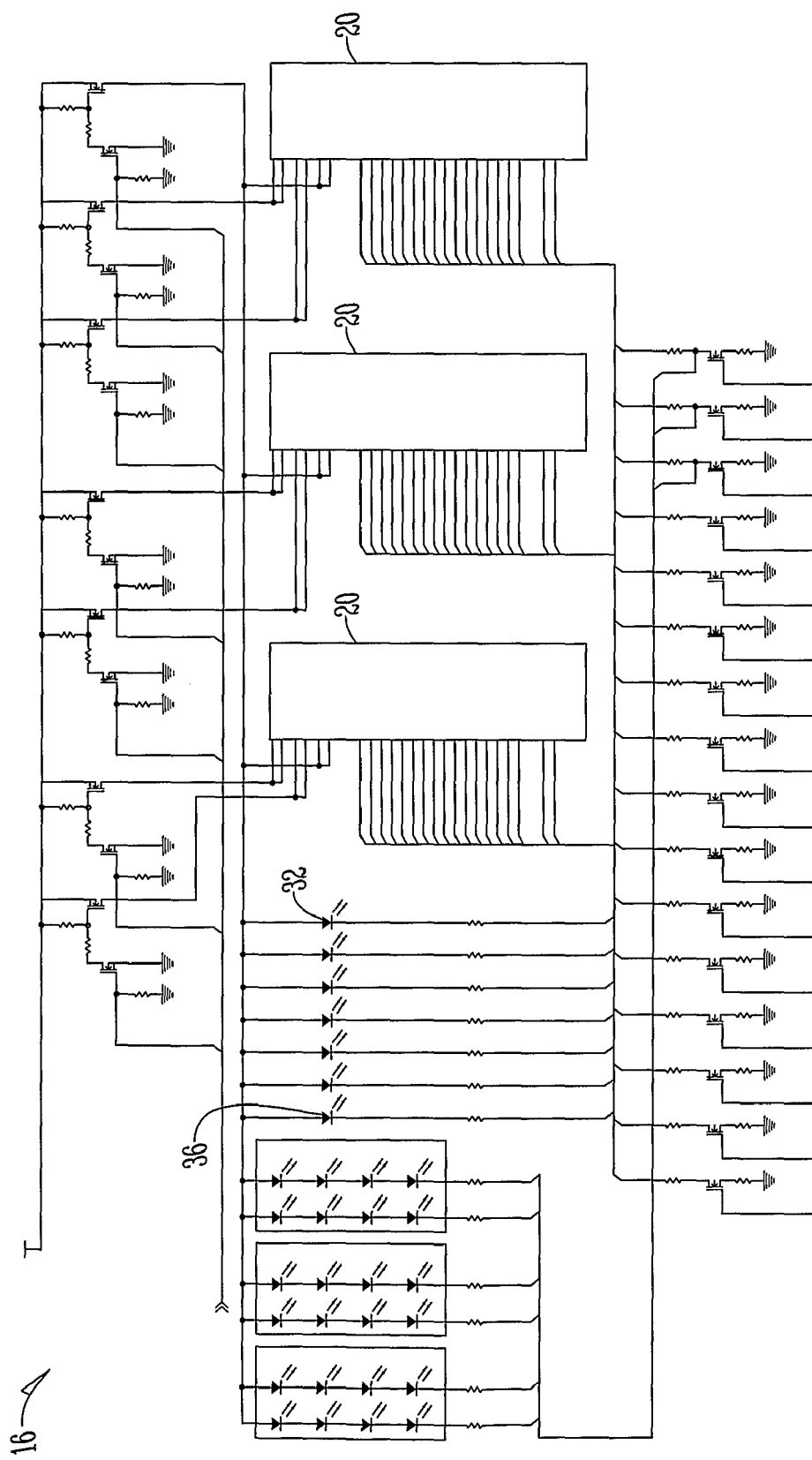
FIG. 3 is a schematic diagram of displays and backlighting used on a control panel.
Figure 4:
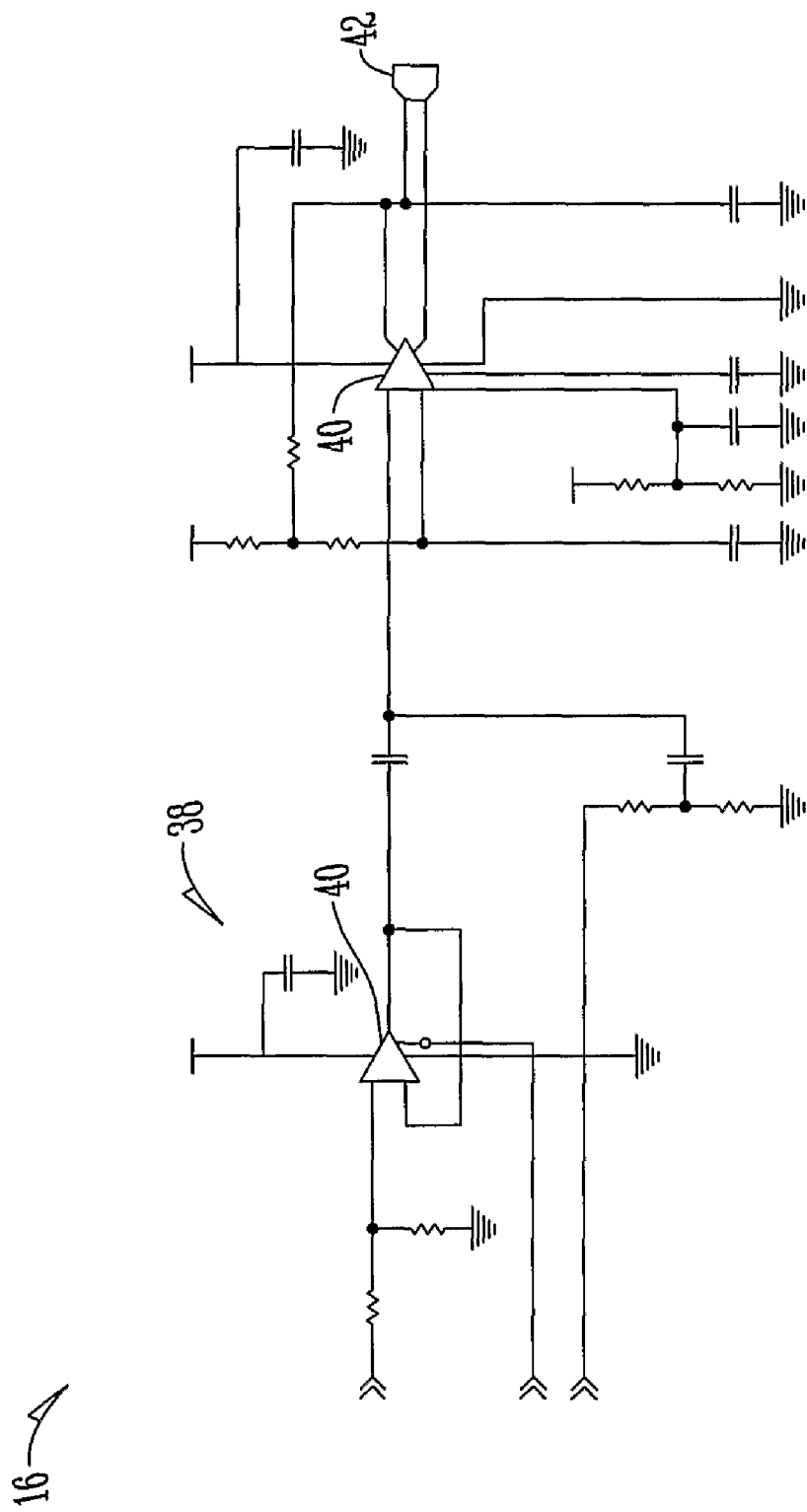
FIG. 4 is a schematic diagram of a speaker system used on a control panel.
Figure 5:
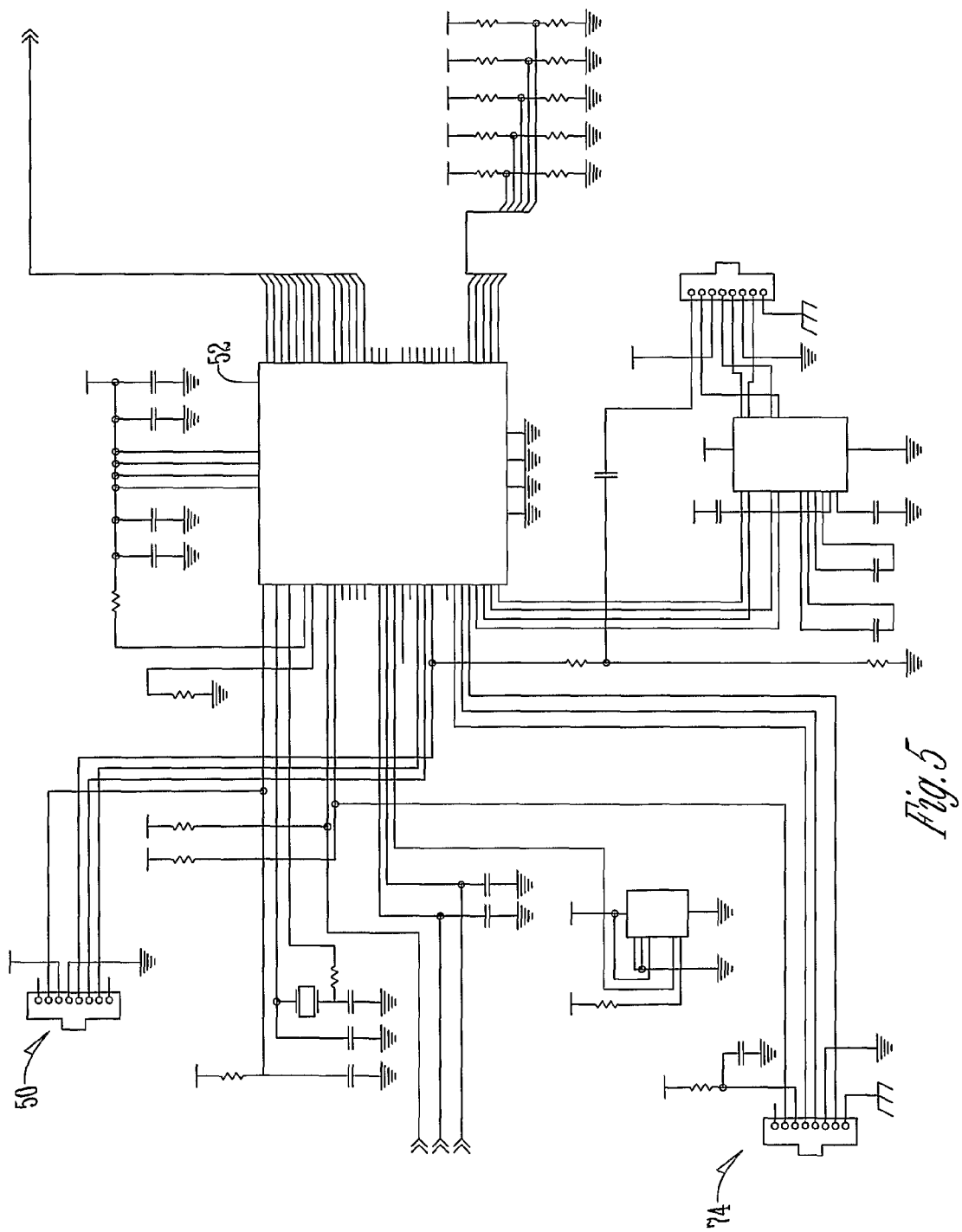
FIG. 5 is a schematic diagram of a power unit of a sauna including a microprocessor and non-volatile memory chip.
Figure 6:
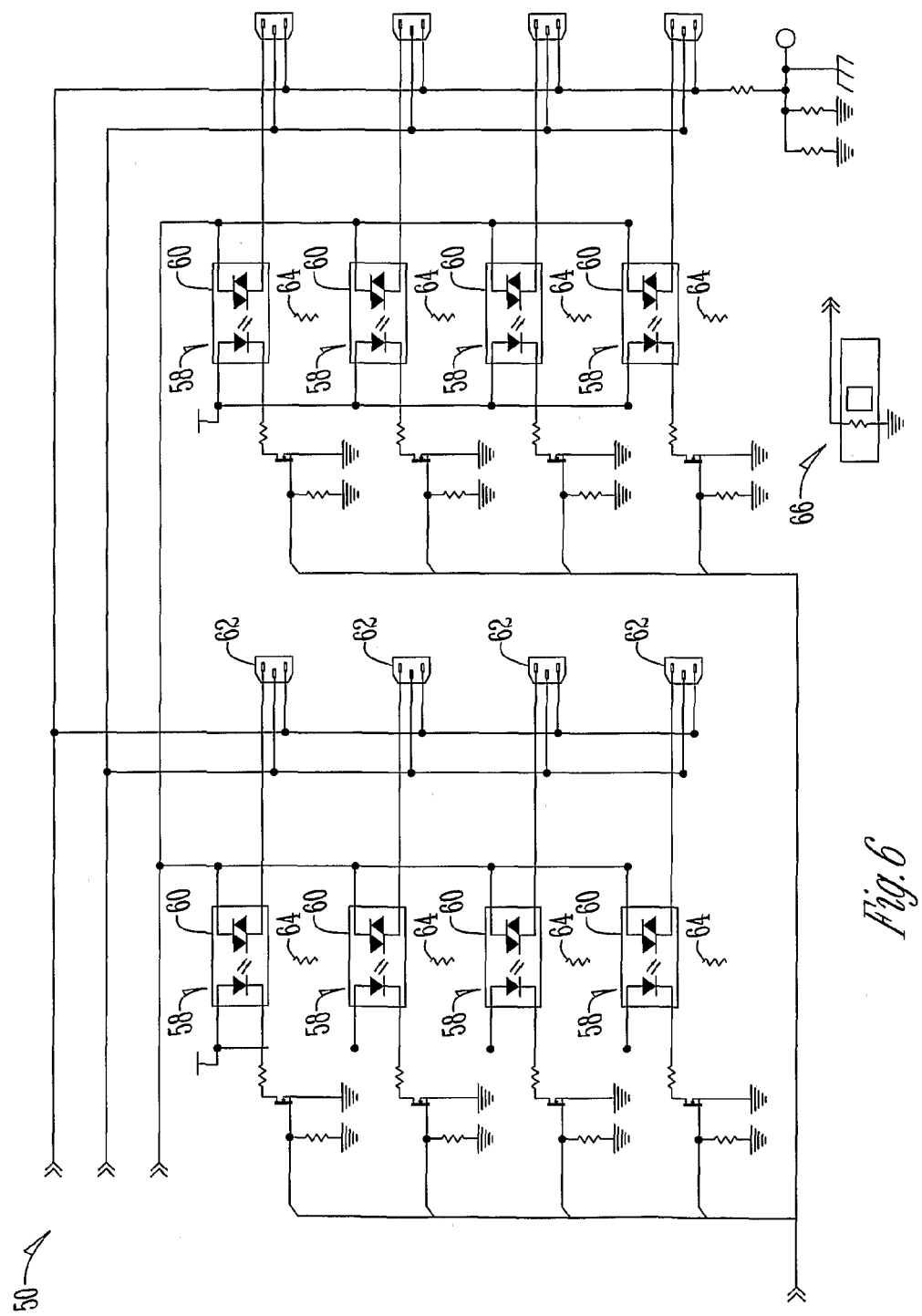
FIG. 6 is a schematic diagram of electrical control devices of a power unit of a sauna.
Figure 7:
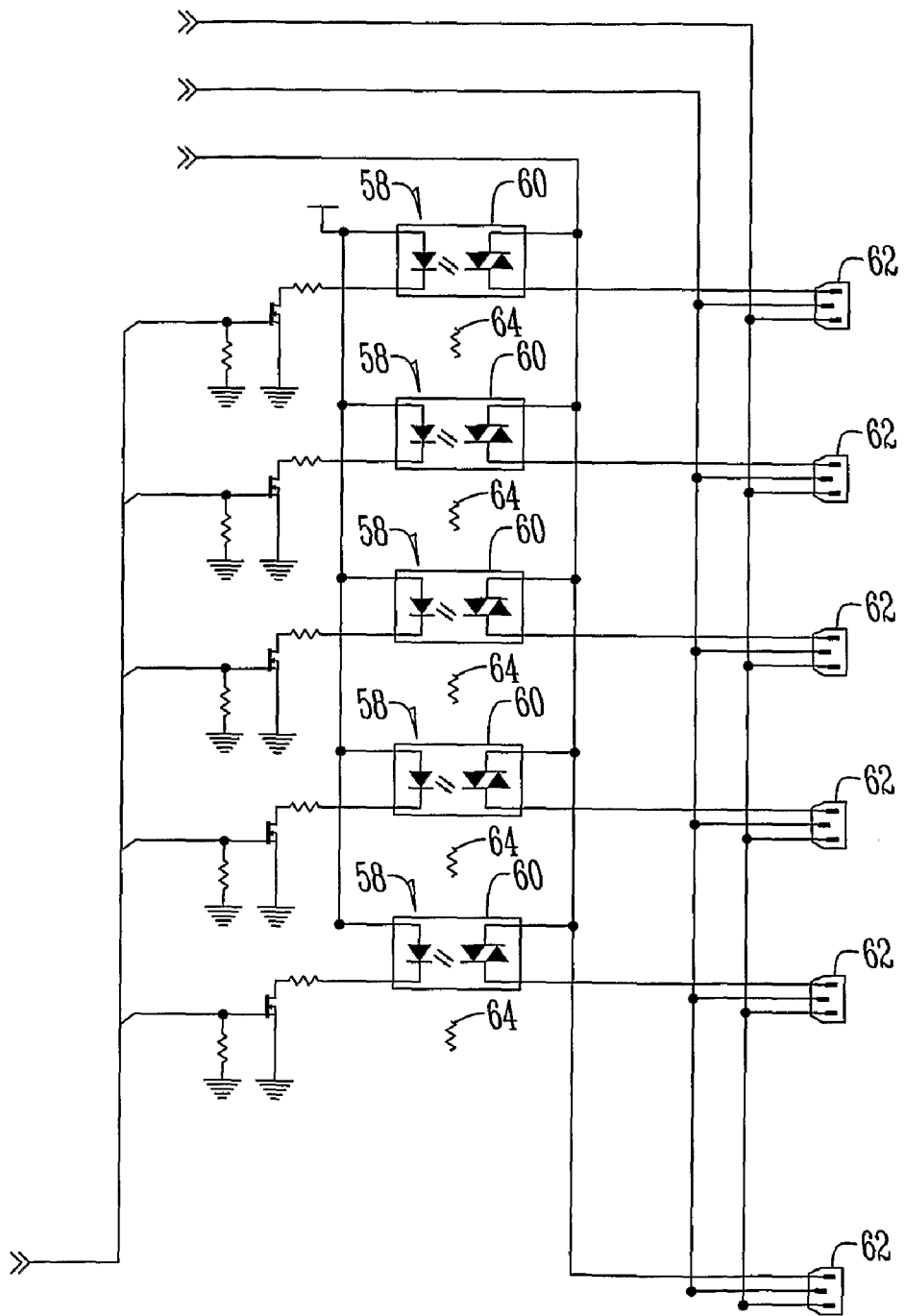
FIG. 7 is a schematic diagram of electrical control devices of a power unit of a sauna.
Figure 8:
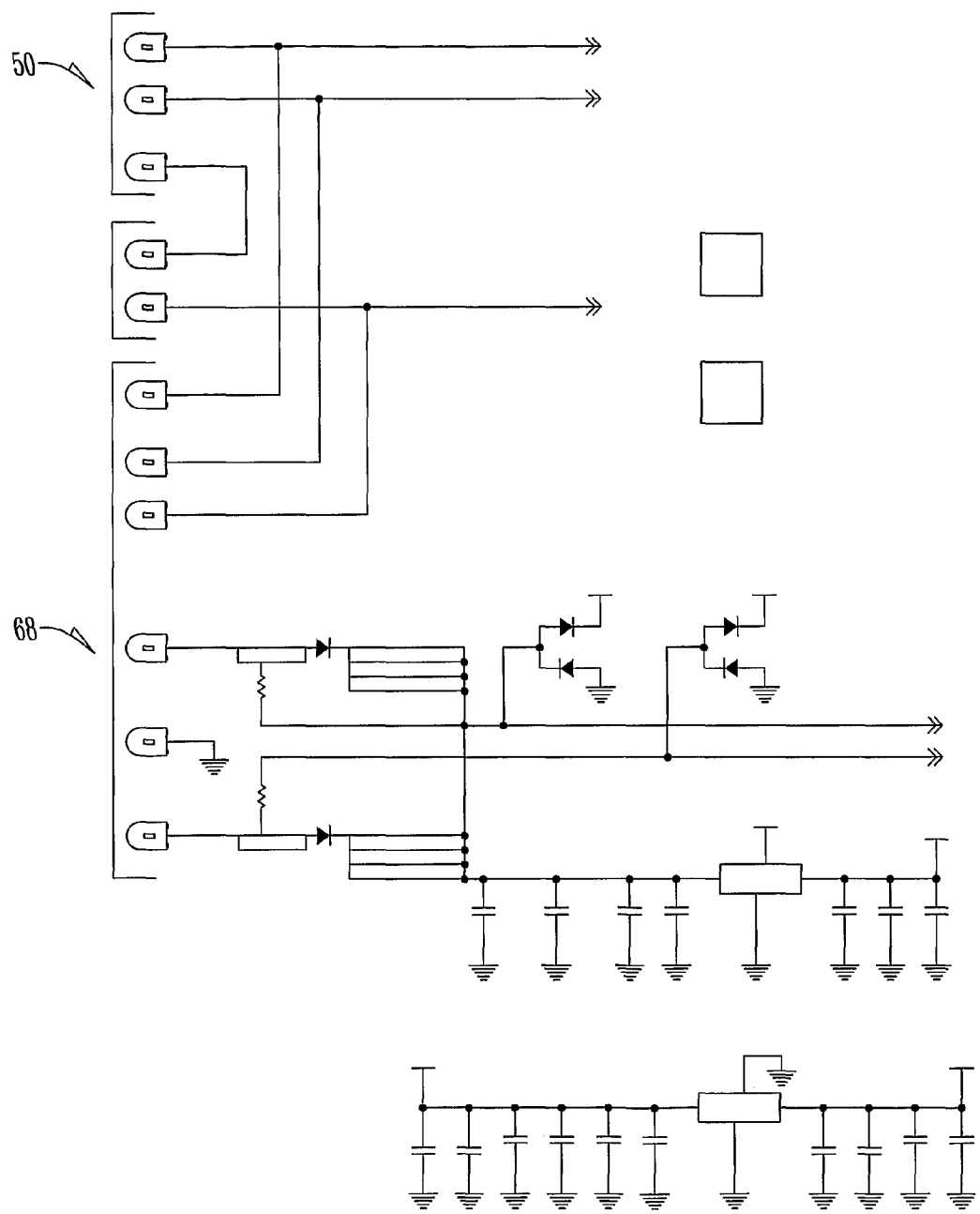
FIG. 8 is a schematic diagram of a power supply of a power unit of a sauna.

As seen in FIGS. 2-4 the control panel or interface 16 is a complex circuit that causes the desired functioning of the control panel 16. Specifically, the control panel 16 internally has the plurality of buttons 22 that are electrically connected to a microprocessor 30. Microprocessor 30 contains a software program that controls the operation of the control panel 16 and the sauna 10. A non-volatile memory chip is employed to save a program even when power of the control panel 16 is discontinued. Furthermore, the software provides a seven day programmable timer for seven day operation of the sauna 10 having a static memory so programs are not lost when the power goes out. The software loads automatically upon being turned on. The software also causes digital outputs in the displays 20. Other features of the software includes temperature readouts in F/C, real time clock, high temperature limit cut off with manual reset, and the like. The microprocessor controls are adaptable and expandable to additional programmable functions.

Electrically connected and operably controlled by the microprocessor 30 are a plurality of operating systems that include the digital output of displays 20, the lighting of the openings 18 by LEDs 32 (light emitting diodes) and backlighting 34 of the control panel 16. The backlighting 34 consists of a plurality of LEDs 36 that provide backlighting so that the digital outputs of the displays 20 are seen by an observer. The software in the microprocessor 30 is programmed to backlight a logo from left to right. Furthermore, the LEDs 32 and 36 alternatively are different colors depending upon the application. Thus, when a button 22 is compressed, the button electrically communicates with the chip 30 that sends a signal to one of the displays 20, or light emitting diodes 32 or 36 consistent with this signal. A unique feature of the control panel function is the use of time division multiplexing used to operate the LED display elements. Additionally control panels 16 can be serially connected together, allowing for control of the sauna from multiple locations.

Also electrically and operably connected to the microprocessor 30 is another control system that is a speaker system 38 that comprises a pair of operational amplifiers 40 that are connected to a speaker 42 such that the circuit allows not only audio but also a beeping noise to be made depending on the button 22 that is pressed.

FIGS. 5-8 show the power unit 50 of the sauna 10. The power unit 50 has its own microprocessor 52 that communicates with the microprocessor 30 of the control panel 16. Like the microprocessor 30 of the control panel 16, the microprocessor 52 of the power unit 50, has software that controls the functions of the items on the power unit 50. Additionally, the microprocessor 52 has a pulse width modulator or square wave output such that a pulse width modulation output is sent to the elements within the power unit 50.

Operably and electrically connected to the microprocessor 52 are a plurality of optical isolated drivers 58. The isolators 58 are comprised of a plurality of triacs 60 that are associated with AC receptacles 62. By using a pulse width modular output, or wave function, the heat produced by the heating element (not shown) when attached to the receptacle 62 is intermittent and variable, and thus the heat produced by the attached heating elements is output in waves of different intensity that correspond with the pulse width modulation. Thus the software of the control panel 16 controls the pulse width modulation output to drive the triacs 60. Therefore, an operator of the sauna feels a constant heat from the heating element. Thus, a five level heater control with gentle balance and constant emission is achieved.

Connected to the isolators 58 is a heat sink 66 for dissipating heat generated by current flowing through the isolators 58 to provide maximum efficiency and increase the life span of the system and components. The power unit 50 also has a receptacle dedicated to providing power to an interior 120 vac light with an adjustable dimmer, which is activated from the control panel 16, and receptacle for temperature probe 74, used for keeping an accurate and consistent temperature within the sauna 10. The temperature probe is accurate to 1° C. Preferably the temperature probe is accurate within 1° C. The light switch and the temperature probe are both logically and electrically connected to the microprocessor 52. Using information from the temperature probe 74 the microprocessor 52 intelligently operates the triacs 60 to produce a desired heating output controlling each heater separately. Therefore by mounting the triacs 60 on the heat sink 66 and intelligently operating the triacs 60, hot spots on the heat sink 66 are minimized. Thus five levels of intensity for precise adjustments are used for the heating elements and dimmer control for the 120 vac light.

The power unit 50 has a plurality of receptacles 62 such that multiple heaters are attached to a single power unit 50.

Some of the benefits of the newly designed system include the single function button switches 22 for easy operation and quick access. Additionally, audio signals with a speaker system are utilized when the buttons 22 are activated giving the user an audible feedback assuring that the button function is activated.

The present circuit design also allows for a plurality of functions by the control panel 16. For example, when the control panel 16 is plugged in, the unit is in standby mode. At this time the logo backlight 34 is turned on going left from right lighting the logo. Additionally, the clock display, temp display with a current temperature, and the Sunday LED 36 are simultaneously turned on. Next, the clock is set by pressing the up or down button 22 adjacent the clock display 20 to set the current time. The display also shows A.M. and P.M. indicator LEDs.

Next, the current date is set: the scroll down button is pressed until the LED 32 is activated next to the adjacent day. Similarly, the temperature set and timer set buttons 22 create similar results. When the unit is in operating mode the temp display 20 shows the actual temperature inside the sauna 10. When an operator pushes the up or down button 22 beside the temp display or the operating mode, the set temperature is displayed and is changed. Then the actual temperature is displayed five seconds after the last adjustment is made.

In one embodiment the software in the microprocessor 30 is programmed to control each triac 60 individually in order to incrementally control each individual heating unit. In this embodiment each heating unit has sixteen varying levels that are incrementally controlled by the power received from the triacs 60 that are controlled by the microprocessor 30. Thus, with an extremely accurate temperature probe 74 the precise level of heat each heating unit must produce in order to maintain the temperature at a constant rate is controlled by the triacs 60.

As an additional option, in one embodiment the software is able to cycle the power provided to each heater. For example only, when four heaters are present, in a first cycle the first heater remains deactivated while the second, third and fourth heaters produce heat. Then a millisecond later, in a second cycle the first, third and fourth heaters produce heat while the second heater is deactivated, etc. This allows the heater to be heated by drawing less current than is previously required because at all times only three out of the four heaters is drawing power. Nonetheless, because the microprocessor varies the sixteen levels at which heat is provided, the proper temperature is maintained.

Alternatively, additional features and functions include that only one program per day is possible. Specifically, when in the program mode an LED 32 is lit for each day where a program is entered. When the control panel 16 is turned on, if a program has not been set, the control panel defaults and the last program used loads automatically. To change the program for that day the set button 22 is pressed until that day is selected. Pushing the set button 22 when the clock, temp, or timer displays 20 are flashing erases that days program and the day LED 36 begins flashing thus, reverting back to the first step of the programming for the day. Likewise, pushing the on/off button 22 when the clock, temp, or timer displays 20 are flashing erases that day's program, and switches the unit into standby mode. Thus the program has predetermined cycles and time settings.

Using the quick start method overrides a program set for that day but does not alter the program or erase it. The program only operates from the standby mode. When the unit is manually turned on using the quick start method, the programs are not active. Thus, depending on which buttons 22 are pressed, different signals are sent to the microprocessor 30 of the control panel 16 causing predetermined functions and results to occur. The combination of the control panel 16 and power unit 50 allows a user to set programs for the sauna 10 including lengths of time the heat is to be produced, when the heat is produced and the temperatures desired by the user. Additionally, because of the pulse width modulation output of the microprocessor 52 of the power unit 50 the heat comes in pulsations or heat waves from heating elements allowing heating and an enjoyable experience for a user. Finally, the functions and controls are easily adaptable for custom applications. Thus, at the very least, all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A sauna control system comprising:
 a control panel having a microprocessor for inputting information to operate the sauna;
 a power unit having a microprocessor in communication with the microprocessor of the control panel;
 a plurality of heating elements logically connected to the microprocessor of the power unit such that multiple heating elements are attached to the single power unit of the sauna;
 a plurality of triacs each controlled by the microprocessor of the power unit wherein each individual triac of the plurality of triacs incrementally controls an individual heating element such that the temperature of the sauna is maintained at a constant rate by the microprocessor of the power unit; and
 wherein the microprocessor of the power unit sends a Pulse Width Modulation output signal to each individual triac to independently control the operation of each heating element of the plurality of heating elements of the sauna such that each individual heating element is incrementally controlled to continuously produce varying intensities of heat that correspond with the Pulse Width Modulation output signal.

2. The sauna control system of claim 1 wherein the triacs are connected to a heat sink.

3. The sauna control system of claim 1 wherein the control panel comprises:
- a plurality of buttons logically connected to a microprocessor of a control panel;
- a plurality of operating systems used to operate the microprocessor of a control panel; and
- wherein actuation of a button sends an electric signal to the microprocessor of the control panel such that the microprocessor activates at least one of the operating system features.

4. The sauna control system of claim 3 wherein an operating system is a plurality of systems that provide a digital output.

5. The sauna control system of claim 3 wherein an operating system operates backlighting for the control panel.

6. The sauna control system of claim 5 wherein the backlighting comprises a plurality of light emitting diodes.

7. The sauna control system of claim 3 wherein an operating system comprises a speaker system.

8. The sauna control system of claim 1 wherein the microprocessor of the control panel has programmable software therein for controlling operating systems within the sauna.

9. The sauna control system of claim 8 wherein the programmable software allows a sauna user to set the time.

10. The sauna control system of claim 8 wherein the programmable software allows a sauna user to set the temperature inside of a sauna compartment.

11. The sauna control system of claim 1 wherein the power unit has a temperature probe electrically connected thereto that sends a signal to the microprocessor of the power unit based upon a temperature reading.

12. A method of heating a sauna with a control system comprising steps of:
- providing a control panel having a microprocessor for inputting information to operate the sauna;
- providing a power unit having a microprocessor in communication with the microprocessor of the control panel;
- providing a plurality of heating elements electrically connected to the microprocessor of the power unit such that multiple heating elements are attached to the single power unit of the sauna;
- providing a plurality of triacs each controlled by the microprocessor of the power unit wherein each individual triac of the plurality of triacs incrementally controls an individual heating element such that the temperature of the sauna is maintained at a constant rate by the microprocessor of the power unit; and
- sending a Pulse Width Modulation output from the microprocessor of the power unit to each individual triac to independently control the operation of each heating element of the plurality of heating elements of the sauna such that each individual heating element is incrementally controlled to continuously produce varying intensities of heat that correspond with the Pulse Width Modulation output signal.

13. The method of claim 12 further comprising the steps of providing power to the heating units from the triacs in cycles.

14. The method of claim 13 wherein during each cycle less than all of the heating units are operational.

* * * * *